United States Patent [19]

Tsunoi

[11] Patent Number: 4,693,548
[45] Date of Patent: Sep. 15, 1987

[54] DEVICE FOR RECORDING INFORMATION ON A PHOTOSENSITIVE MEDIUM FOR ELECTROPHOTOGRAPHY

[75] Inventor: Haruo Tsunoi, Kawasaki, Japan

[73] Assignee: Canon Kabushiki Kaisha, Tokyo, Japan

[21] Appl. No.: 694,905

[22] Filed: Jan. 25, 1985

Related U.S. Application Data

[63] Continuation of Ser. No. 350,062, Feb. 18, 1982, abandoned.

[30] Foreign Application Priority Data

Feb. 27, 1981 [JP] Japan .................................. 56-27762

[51] Int. Cl.⁴ ...................... G02B 6/10; G03G 15/00; G01D 9/04
[52] U.S. Cl. .............................. 350/96.13; 350/96.14; 350/96.12; 350/358; 350/96.18; 355/3 R; 355/3 DR; 355/8; 355/16; 354/3; 346/44
[58] Field of Search ............... 350/96.10, 96.13, 96.14, 350/96.18, 96.12, 358; 250/227; 355/3 R, 8, 84, 3 DR, 81, 16; 354/3; 346/44

[56] References Cited

U.S. PATENT DOCUMENTS

| | | | |
|---|---|---|---|
| 3,841,733 | 10/1974 | Ebersole | 350/96.14 |
| 3,877,784 | 4/1975 | Lin | 350/96 |
| 4,030,806 | 6/1977 | Goshima et al. | 350/7 |
| 4,162,121 | 7/1979 | Starkweather et al. | 350/358 |
| 4,198,154 | 4/1980 | Masegi et al. | 355/5 |
| 4,253,060 | 2/1981 | Chen | 350/96.14 |
| 4,297,704 | 10/1981 | Marom et al. | 350/96.13 |
| 4,421,387 | 12/1983 | Sprague | 350/96.14 |
| 4,425,023 | 1/1984 | Matsumoto et al. | 350/96 |
| 4,592,621 | 6/1986 | Amano et al. | 350/358 |
| 4,614,408 | 9/1986 | Mir et al. | 350/96.14 X |
| 4,635,082 | 1/1987 | Domoto et al. | 350/96.14 X |

OTHER PUBLICATIONS

Tsai, "Guided Wave Acousto-Optics Fundamentals and Wideband Applications", SPIE, vol. 139, Guided Wave Optical Systems and Devices, 1978, pp. 132-143.
Righini et al, "Signal Processing... Geodesic Lenses", Conf. Proceed of SPIE, Netherlands 10/78, pp. 20-25.

Primary Examiner—William L. Sikes
Assistant Examiner—Brian M. Healy
Attorney, Agent, or Firm—Fitzpatrick, Cella, Harper & Scinto

[57] ABSTRACT

A novel information recording device scans and exposes a photosensitive medium for electrophotography by information light by the use of a scanning light forming optical integrated circuit (IOS) including a light deflecting portion and a condensing thin film lens on a thin film waveguide path. The device, as compared with prior art information recording devices using beam spot scanning, is very compact and capable of high-speed recording and can realize a low cost of manufacture.

4 Claims, 7 Drawing Figures

DEVICE FOR RECORDING INFORMATION ON A PHOTOSENSITIVE MEDIUM FOR ELECTROPHOTOGRAPHY

This application is a continuation of application Ser. No. 350,062 filed Feb. 18, 1982, now abandoned.

BACKGROUND OF THE INVENTION

1. Field of the Invention

This invention relates to an information recording device using a photosensitive medium for electrophotography to record desired information such as the output of a computer 2. Description of the Prior Art As a recording device of the described type, there is known one which uses a so-called beam spot scanning device which scans and exposes a photosensitive medium for electrophotography by an information light such as a laser beam or the like.

Apparatus for scanning a laser beam spot have heretofore comprised a rotational polygon mirror for deflecting the laser beam and an f-θ lens or the like for condensing the deflected beam into a spot moving at a linear speed. In these prior art apparatus, however, various operating portions have been separate and independent and a predetermined light path interval has been required therebetween and therefore, precise adjustment during the assembly of the apparatus has been very much complicated and the assembled apparatus has been bulky.

Also, very high shape accuracy of the rotational polygon mirror and very high accuracy of the driving device have been required and this has resulted in a high cost of the apparatus. Further, such apparatus have been insufficient with respect to scanning speed.

There are also known apparatus which use an acoustic optical deflector instead of a rotational polygon mirror to make the apparatus compact. An example of such apparatus is disclosed in U.S. Pat. No. 3,514,534, but even in that example, various operating portions are still independent and therefore, cumbersome adjustment has been required during the assembly.

On the other hand, the thin film waveguide path light integration technique has recently been developed. This technique is introduced in T. Tamir, "*Integrated Optics*", Spinger Verlag Co., Inc. (1975), etc. and the contents thereof are concerned with the so-called optical integrated circuit. A novel beam spot scanning device by utilizing the above-mentioned technique has been proposed in U.S. patent application Ser. No. 228,744 filed Jan. 27, 1981, now U.S. Pat. No. 4,425,023, issued Jan. 10, 1984 by the same assignee of the subject application. This beam spot scanning device is to be called a scanning light forming optical integrated circuit (Integrated Optical Scanner: IOS), in which a light deflecting portion and a condensing thin film lens are formed on a thin film waveguide path and scanning of a beam spot is effected on or near the end surface of the thin film waveguide path. This IOS is very compact and capable of high-speed scanning.

SUMMARY OF THE INVENTION

It is an object of the present invention to provide an information recording device which is compact and capable of high-speed recording. It is a further object of the present invention to provide an information recording device which achieves sufficient accuracy without the precise adjustment during assembly and accordingly is low in cost.

The present invention achieves these objects by constructing an information recording device which scans and exposes a photosensitive medium for electrophotography by an information light by the use of the above-described novel scanning light forming optical integrated cricuit (IOS).

In said IOS, light beam deflecting means and condensing means are compactly integrated on a waveguide path and therefore, the information recording device of the present invention can be made compact without requiring a great optical path length for beam spot scanning. It also eliminates an optical system formed by elements of high accuracy as well as the precise adjustment of such optical system, and its low cost can be realized. Further, due to the high-speed scanning property of the IOS, the recording speed of the information recording device of the present invention is very high.

The invention will become more fully apparent from the following detailed description thereof taken in conjunction with the accompanying drawings.

DESCRIPTION OF THE PREFERRED EMBODIMENTS

Figure 1:
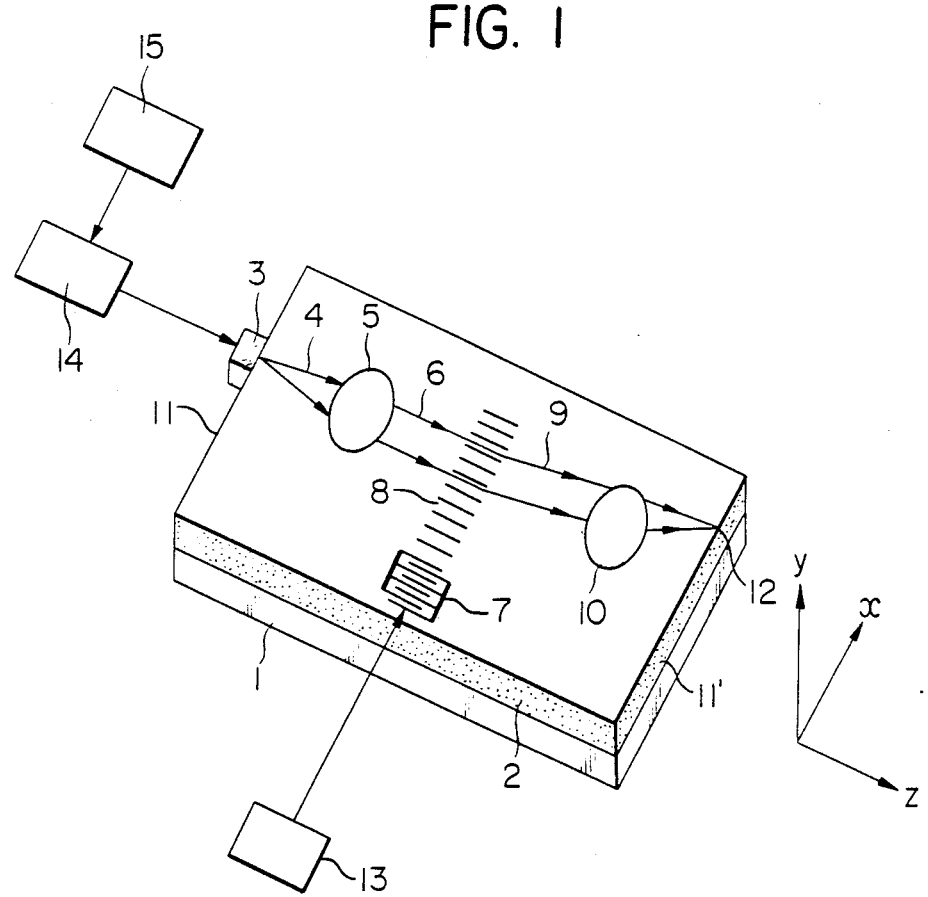
FIG. 1 is a perspective view schematically showing a scanning light forming optical integrated circuit (IOS) used with the present invention.

An example of IOS suitably utilizable for the present invention will first be described with reference to FIGS. 1, 2, 3 and 4. The IOS of FIG. 1 comprises a thin film waveguide path 2 of a thickness, for example, of the order of $1\mu$ formed as by doping Ti on the surface of a substrate 1 of $LiNbO_3$. A semiconductor laser 3, for example, as a coherent light source is provided in proximity to the end surface 11 of the thin film waveguide path 2. A divergent laser light 4 having entered the thin film waveguide path 2 from the end surface 11 is collimated into a parallel light beam 6 by a thin film lens 5. The light beam 6 transmitted through the thin film waveguide path is caused to create a diffracting action and deflected by an optical diffraction grating formed by an ultrasonic wave surface elastic wave 8. The ultrasonic wave surface elastic wave 8 is excited by applying a voltage from a high-frequency wave voltage source 13 to a comb-tooth-like (interdigital type) electrode 7 provided on a portion of the thin film waveguide path 2 by the evaporation technique. Further, the deflected light beam 9 deflected by the ultrasonic wave surface elastic wave 8 is condensed by a thin film lens 10 so as to form a calescence point 12 on the end surface 11' of the thin film waveguide path. That is, the end surface 11' is formed at a position substantially coincident with the focal plane of the thin film lens 10 having a power in the x-z plane (shown), and the condensed light beam is condensed on or near the end surface 11' in the x direction and exits therefrom. The dimensions of the light beam are limited by the thickness of the thin film waveguide path in the y direction perpendicular to the x-z plane. In such a construction, with the beam spot scanning element of FIG. 1 (also of FIGS. 2, 3 and 4), the high-frequency wave voltage of the voltage source 13 applied to the comb-tooth-like electrode 7 is periodically varied to periodically vary the wavelength of the ultrasonic wave surface elastic wave on the thin film waveguide path, thereby controlling the deflection angle of the light beam 9 and obtaining the scanning beam spot on the exit end surface.

Figure 2:
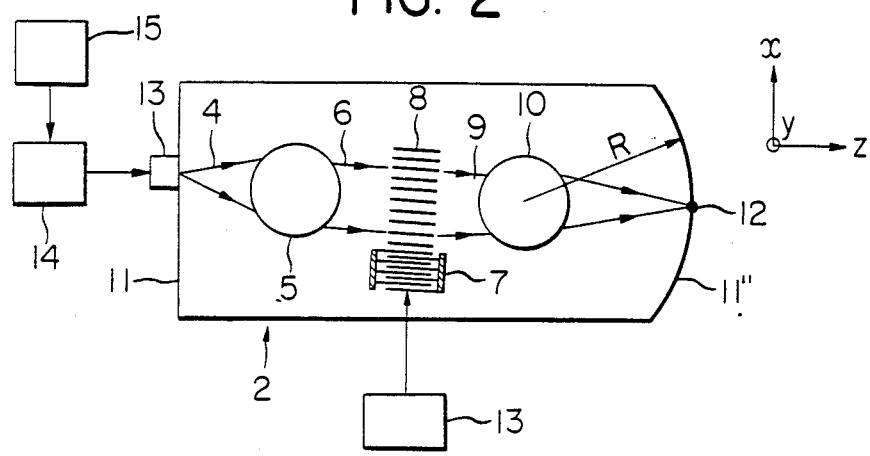
FIG. 2 is a plan view of a scanning light forming optical integrated circuit in which the exit end surface of the waveguide path is curved so that the diameter of the beam spot is not varied during scanning.

FIG. 2 shows an arrangement which prevents any focus deviation created in the beam spot scanning element of FIG. 1 when the deflection angle of the light beam 9 has become greater, that is, when the scanning band has become wider.

In FIG. 1, the position of the focal point when the light beam is deflected by $\Delta\phi$ creates a deviation of $$\Delta = \frac{1}{\cos(\Delta\phi/2)} - 1$$

from the focal plane of the on-axis light beam scanning surface is curved as well. If $\Delta\phi$ is small, for example, of the order of $\Delta\phi=6°$, then $\Delta=1$ μm and this is negligible. Where the deflection angle is great, if the beam spot scanning is effected on the flat end surface 11' as shown in FIG. 1, the size of the beam spot on the flat end surface will be caused to fluctuate by the focus deviation in the course of scanning and this is inconvenient where high resolution of the recorded image is required. What has solved this inconvenience is the beam spot scanning element shown in FIG. 2.

In this example, to solve the aforementioned focus deviation error, the light beam exit end surface is formed into a cylindrical end surface 11" concentric with the lens 10, as shown in FIG. 2. By thus forming the exit surface into a shape substantially conforming to the image plane of the condensing thin film lens 10, any focus blur can be eliminated.

Figure 3:
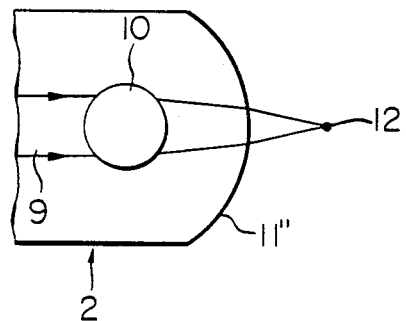
FIG. 3 is a partial view of an integrated optical scanner which effects beam spot scanning outside the end surface of the waveguide path.

The example of FIG. 2 is effective not only where the light-condensing point 12 by the condenser lens 10 lies on the exit end surface 11", but also where the light-condensing point 12 lies outside the exit end surface 11" as shown in FIG. 3. In that case, light is condensed in the x direction but light is defocused in the y direction which is the vertical direction of the film.

Accordingly, to cause light to be condensed in both the x and y directions, a cylindrical lens having a condensing function only in the y direction may be provided outside and the light-condensed point in the y direction may be made coincident with the light-condensed point in the x direction.

Figure 4:
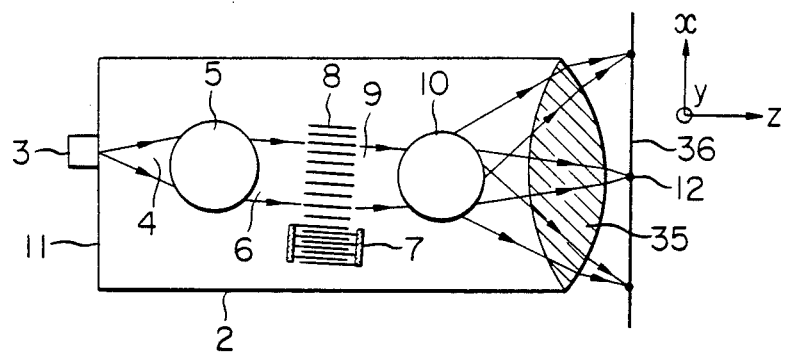
FIG. 4 is a plan view of an integrated optical scanner provided with a field-flat thin film lens.

FIG. 4 shows another embodiment of the beam spot scanning device which solves the problem of focus deviation. The beam spot scanning device shown in FIG. 4, as compared with the device shown in FIG. 1, has a field-flat type thin film lens 35 (field flattener) provided adjacent to the exit end surface of the thin film waveguide path 2, which thin film lens 35 acts on the light beam deflected by a deflecting portion and condensed on the curved image plane near the exit end surface by the thin film lens 10 so as to form a beam spot on a straight line 36. Accordingly, this beam spot scanning device can effect field-flat scanning with respect to the surface of a photosensitive medium and is very preferable as a scanning device. It is also possible to endow this field-flat type thin film lens with an f-θ lens function.

Also, if the field-flat type thin film lens 35 is provided between the exit end surface and the thin film lens 10 and the exit end of the waveguide path is made straight as shown in FIG. 1 and the light-condensed point is designed to be coincident with the exit end, then stable plane scanning will be possible on the exit end surface.

In the present embodiment, the thin film lens 10 and the field-flat type thin film lens are installed separately from each other, but if the design conditions permit, they may of course be replaced by a single thin film lens which will function as both lenses In FIGS. 1, 2, 3 and 4, modulation of light, namely, formation of information light, can be achieved either by adopting a well-known method of controlling a laser driving circuit 14 by a recorded electrical signal generating circuit 15 or by high-voltage-controlling the voltage applied to the electrode 7 correspondingly to the recorded electrical signal Also, in FIGS. 1, 2 and 3, the thin film lenses 5 and 10 may be so-called luneburg lenses or geodisic lenses taking a spherical shape (if depicted in plan view, a circular shape) slightly protuberant convexly or slightly depressed concavely on the thin film waveguide path 2.

Description will hereinafter be made of embodiments of the present invention which utilize the above-described IOS.

Figure 5:
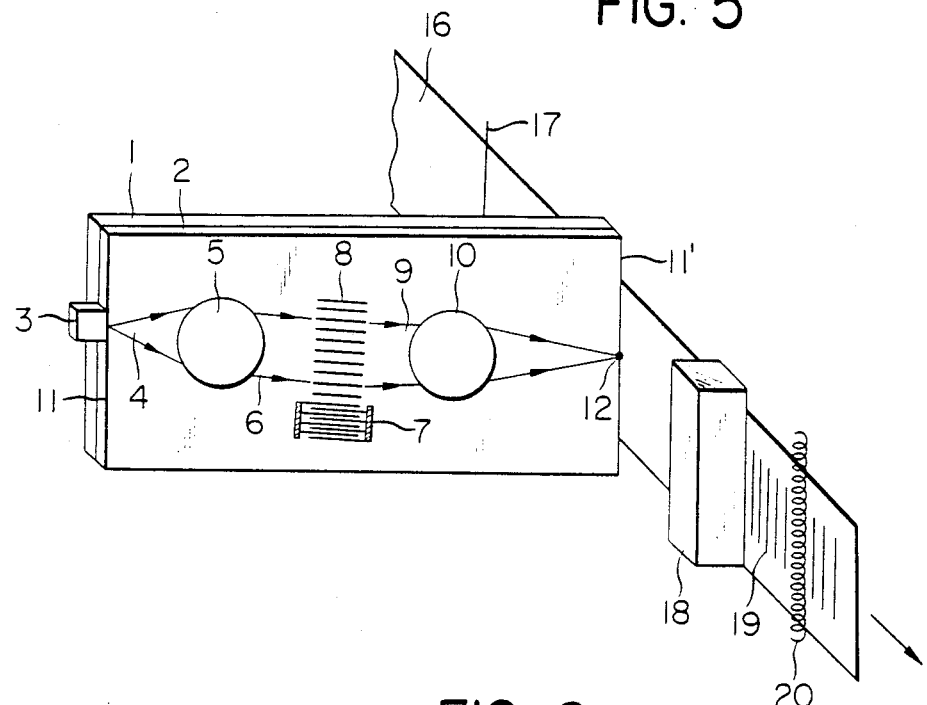
FIG. 5 is a perspective view showing an embodiment of the device of the present invention which records information on a narrow-width tape-like sheet having an electrophotographic photosensitive medium on the surface thereof.

FIG. 5 shows an information recording device using the IOS shown in FIG. 1. Designated by 16 is a narrow-width tape-like sheet having an electrophotographic photosensitive medium on the surface thereof and transported in the direction of arrow (the lengthwise direction of the tape) with the back side thereof attracted to a suction belt, not shown. The sheet 16 is moved with the photosensitive surface thereof in proximity to the light exit end surface 11' of the thin film waveguide path of the integrated circuit.

Now, the photosensitive surface of the sheet 16 is first charged by a corona discharge electrode 17, and then scanned by the scanning beam spot 12 of the information light formed on the end surface 11' of the thin film waveguide path 2, whereby an electrostatic latent image corresponding to a desired recorded signal is formed on the sheet 16. This latent image is developed into a toner image 19 by a developing device 18. This toner image 19 in turn is heated and melted by a heater 20 and fixed on the sheet 16.

Figure 6:
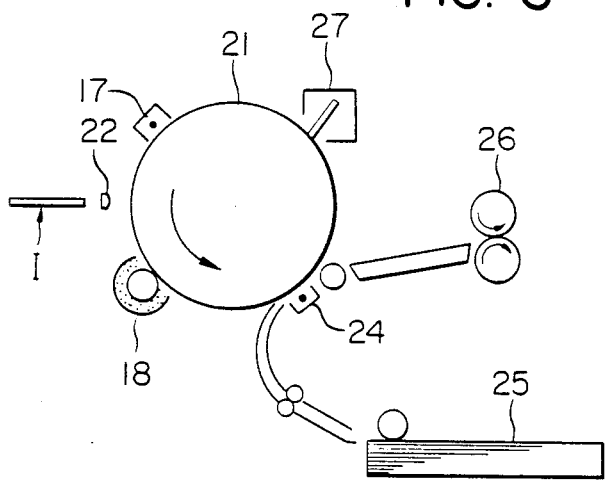
FIG. 6 is a cross-sectional view showing an information recording device of the present invention which exposes a photosensitive drum by an information light.

FIG. 6 is a cross-sectional view illutrating an embodiment of the information recording device using a photosensitive drum for electrophotography as a photosensitive medium. In this embodiment, the IOS I shown in FIG. 3 is used as the beam spot scanning device and scanning is effected on the peripheral surface of the photosensitive drum 21 by an optical system comprising the IOS I and a cylindrical lens 22. The cylindrical lens 22 has a light-converging property with respect to a direction perpendicular to the film surface of the thin film waveguide path 2 as described in connection with FIG. 3, and condenses light with respect to this direction.

In FIG. 6, the photosensitive drum 21 has an electrophotographic photosensitive medium on the peripheral surface thereof and is rotated counterclockwisely as viewed in the Figure. This photosensitive drum 21 has its surface first uniformly charged by a primary charger 17, whereafter it is subjected to the scanning exposure of information light by the optical system comprising the IOS I and cylindrical lens 22, whereby an electrostatic latent image is formed on the photosensitive drum. This electrostatic latent image is developed into a toner image by a developing device 18. The photosensitive drum 21 after being developed is further rotated counterclockwise so that the image thereon is transferred to a sheet of paper fed to an image transfer station 24 from a paper supply portion 25, whereafter the paper is separated from the drum 21 and passed through a fixing device 26 and discharged. On the other hand, after the image transfer, the surface of the drum is cleaned by a cleaning device 27 to remove any residual toner thereon, thus becoming ready for reuse.

When the length of the photosensitive drum 21 with respect to the direction of rotational axis thereof is short, it suffices to use a single set of an optical system comprising the IOS and a cylindrical lens. However, the deflection angle of the light beam by this IOS cannot be selected to be so great a value.

Accordingly, where the axial length of the drum 21 is great, a plurality of said optical systems may be arranged axially of the drum 21 so that different areas of the drum 21 may be exposed to light by different optical systems. For example, in FIG. 7, three sets of optical systems $S_1$, $S_2$ and $S_3$ each comprising an optical integrated circuit I and a cylindrical lens 22 are used and arranged on a straight line parallel to the axis of the drum 21, so that the areas $A_1$, $A_2$ and $A_3$ of the drum 21 are exposed to light by the optical systems $S_1$, $S_2$ and $S_3$, respectively. The optical systems $S_1$, $S_2$ and $S_3$ are fixedly held on a common support bed 23. The high-frequency wave voltages to be applied to the comb-tooth-like electrodes 7 of the optical systems $S_1$, $S_2$ and $S_3$ should preferably be applied from the same highfrequency wave voltage generating circuit 13. The control of the laser driving circuit for obtaining information light may be effected individually for each of the optical systems $S_1$, $S_2$ and $S_3$ correspondingly to the areas $A_1$, $A_2$ and $A_3$ of the photosensitive medium.

In this manner, an image may be linearly continuously formed even on a photosensitive medium elongated in the axial direction of the drum.

Figure 7:
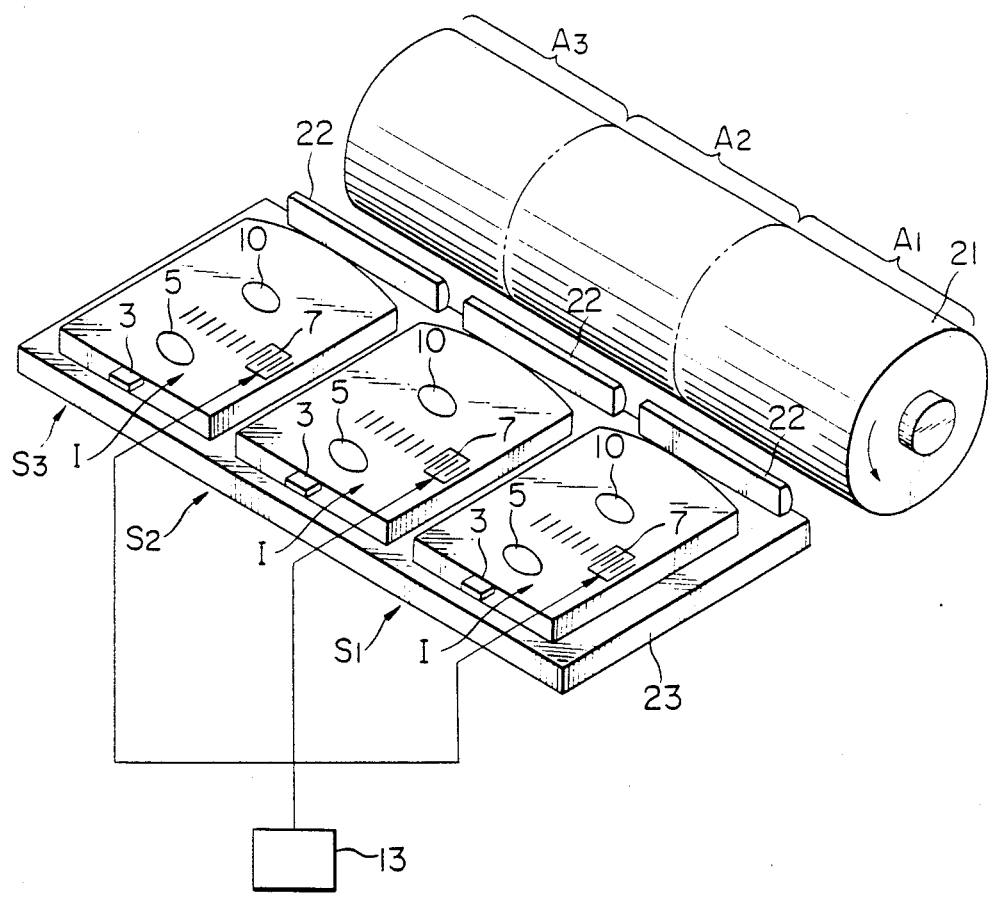
FIG. 7 is a perspective view showing an information recording device of the present invention in which different areas of a photosensitive drum are scanned and exposed by a different one of a plurality of IOS's.

In the examples of FIGS. 6 and 7, the peripheral surface of the photosensitive drum need not be proximate to the optical system as is in the example of FIG. 4.

The information recording device of FIGS. 6 and 7 have been shown with respect to a case where use is made of the IOS shown in FIG. 3, but if use is made of the IOS shown in FIG. 4, field-flat beam spot scanning is possible, and therefore, it is particularly effective where the photosensitive drum is scanned over a wide range as in the present embodiment.

Some embodiments of the present invention have been shown and described above, whereas the present invention is not restricted to these embodiments but it includes all information recording devices in which the electrophotographic photosensitive medium of copying apparatus or the like is scanned and exposed by the use of the IOS shown in FIGS. 1, 2, 3 or 4 or an IOS having a similar construction.

As has been described above, the information recording device of the present invention is capable of high-speed and high-quality recording and is compact and inexpensive and eliminates the necessity of precise adjustment during assembly.

What I claim is:

1. A device for recording information on a photosensitive member, comprising:
    a plurality of independently controlled light sources;
    a plurality of waveguides, each having a length and a width and being adapted to propagate a light beam from an associated said light source along the lengthwise direction, said waveguides being arranged with their widths extending in a predetermined direction such that the widths of said waveguides lie along a line;
    deflecting means for deflecting, in the predetermined direction, the light beams propagated by said respective waveguides;
    a plurality of internal lens systems, one said internal lens system being provided in each of said waveguides; and
    an external lens system for condensing deflected light beams emerging from said waveguides, in cooperation with said internal lens systems, on the photosensitive member such that areas on the photosensitive member exposed by the deflected light beams emerging from said waveguides are larger than the width of any one of said waveguides and are cotinuously arranged in the predetermined direction.

2. A device according to claim 1, wherein said plurality of light sources, said plurality of waveguides, said deflecting means and said external system are fixedly held on a common support bed.

3. A device according to claim 1, wherein each deflecting means includes a combtooth-like transducer for exciting an acoustic wave in said waveguide and means for applying to said transducer a signal whose frequency varies continuously.

4. A device according to claim 3, wherein the signals applied to each of said transducers are supplied from a common signal source.

* * * * *

UNITED STATES PATENT AND TRADEMARK OFFICE
CERTIFICATE OF CORRECTION

PATENT NO. : 4,693,548  
DATED : September 15, 1987  
INVENTOR(S) : HARUO TSUNOI Page 1 of 2

It is certified that error appears in the above-identified patent and that said Letters Patent is hereby corrected as shown below:

COLUMN 1

Line 14, "computer" should read --computer or image information transmitted from a remote place.--.

COLUMN 3

Line 43, "require" should read --required.--.

COLUMN 4

Line 32, "luneburg" should read --Luneburg--.

COLUMN 5

Line 47, "highfre-" should read --high-fre---.
   Line 56, "examplesof" should read --examples of--.

UNITED STATES PATENT AND TRADEMARK OFFICE
CERTIFICATE OF CORRECTION

PATENT NO. : 4,693,548
DATED : September 15, 1987
INVENTOR(S) : HARUO TSUNOI

It is certified that error appears in the above-identified patent and that said Letters Patent is hereby corrected as shown below:

COLUMN 6

Line 45, "cotinuously" should read --continuously--.

Signed and Sealed this

Twelfth Day of April, 1988

Attest:

DONALD J. QUIGG

Attesting Officer

Commissioner of Patents and Trademarks